(12) United States Patent
Pascarella et al.

(10) Patent No.: US 11,809,458 B2
(45) Date of Patent: *Nov. 7, 2023

(54) SYSTEM AND METHOD FOR PROVIDING DATABASE ABSTRACTION AND DATA LINKAGE

(71) Applicant: JPMorgan Chase Bank, N.A., New York, NY (US)

(72) Inventors: Robert Pascarella, New York, NY (US); Neil Gorin, New York, NY (US); D. J. Knoedler, Powell, OH (US); Jean-Francois Legault, Brooklyn, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 174 days.

This patent is subject to a terminal disclaimer.

(21) Appl. No.: 17/343,970

(22) Filed: Jun. 10, 2021

(65) Prior Publication Data

US 2021/0303600 A1    Sep. 30, 2021

Related U.S. Application Data

(63) Continuation of application No. 16/018,600, filed on Jun. 26, 2018, now Pat. No. 11,036,767.

(Continued)

(51) Int. Cl.
*G06F 16/28* (2019.01)
*G06N 20/00* (2019.01)
(Continued)

(52) U.S. Cl.
CPC ........ *G06F 16/287* (2019.01); *G06F 16/2228* (2019.01); *G06F 16/245* (2019.01);
(Continued)

(58) Field of Classification Search
CPC .. G06F 16/287; G06F 16/245; G06F 16/2228; G06F 16/9535; G06F 16/1865;
(Continued)

(56) References Cited

U.S. PATENT DOCUMENTS 8,150,887 B1    4/2012  Wei et al.
9,294,497 B1 *  3/2016  Ben-Or ............... H04L 63/1433
(Continued)

*Primary Examiner* — Evan Aspinwall
(74) *Attorney, Agent, or Firm* — Greenblum & Bernstein, P.L.C.

(57) ABSTRACT

The invention relates to database abstraction and data linkage. According to an embodiment of the present invention, the invention takes a variety of attributes (e.g., names, IP address, device identifiers, addresses, phone numbers, account numbers, etc.) and returns the online activity, demographic data, account data and/or other activity, events and data associated with that attribute. The tool may then iterate over each attribute and return a network of connections having multiple degrees of association. The innovative tool may be linked to known bad actor data, and perform automated searches on this data to proactively alert potentially fraudulent activity. The tool may also be developed to add attributes and apply machine learning to the associations to more intelligently describe the returned network. Further, the tool may be developed to describe larger networks having multiple degrees of connections.

20 Claims, 4 Drawing Sheets

Related U.S. Application Data

(60) Provisional application No. 62/524,762, filed on Jun. 26, 2017.

(51) Int. Cl.
*G06F 16/22* (2019.01)
*G06F 16/9535* (2019.01)
*G06F 16/245* (2019.01)
*G06F 16/18* (2019.01)
*G06N 3/084* (2023.01)

(52) U.S. Cl.
CPC ......... *G06F 16/9535* (2019.01); *G06N 20/00* (2019.01); *G06F 16/1865* (2019.01); *G06N 3/084* (2013.01)

(58) Field of Classification Search
CPC .......... G06N 20/00; G06N 3/084; G06N 3/08; G06N 5/025; G06N 5/022; G06Q 30/0248; G06Q 30/0225; G06Q 10/0635; G06Q 30/0185; G06Q 20/4016; H04L 63/1425; H04L 63/1416; H04L 63/1433; H04L 67/535
USPC ........................................................ 707/711
See application file for complete search history.

(56) References Cited

U.S. PATENT DOCUMENTS

| | | |
|---|---|---|
| 9,342,597 B1 | 5/2016 | Tomkins et al. |
| 9,633,201 B1 | 4/2017 | Katz |
| 10,460,320 B1 | 10/2019 | Cao et al. |
| 2005/0278542 A1 | 12/2005 | Pierson et al. |
| 2009/0132383 A1 | 5/2009 | Piepenbrink et al. |
| 2010/0313241 A1 | 12/2010 | Lee et al. |
| 2012/0159632 A1 | 6/2012 | Barriga et al. |
| 2013/0003595 A1 | 1/2013 | Soomro |
| 2015/0026027 A1* | 1/2015 | Priess ................ G06Q 10/04 705/35 |
| 2015/0242856 A1 | 8/2015 | Dhurandhar et al. |
| 2015/0256678 A1 | 9/2015 | Murillo et al. |
| 2016/0191548 A1 | 6/2016 | Smith et al. |
| 2017/0006135 A1* | 1/2017 | Siebel ................ G06F 16/288 |
| 2017/0032463 A1* | 2/2017 | Hunter ................ G06F 16/285 |
| 2017/0070484 A1 | 3/2017 | Kruse et al. |
| 2017/0111364 A1 | 4/2017 | Rawat |
| 2017/0132636 A1 | 5/2017 | Caldera |
| 2017/0293917 A1 | 10/2017 | Dhurandhar et al. |
| 2018/0013789 A1 | 1/2018 | Damian |
| 2018/0350013 A1 | 12/2018 | Lu et al. |
| 2019/0311287 A1 | 10/2019 | Chew et al. |
| 2019/0370230 A1 | 12/2019 | Jacob et al. |

\* cited by examiner

SYSTEM AND METHOD FOR PROVIDING DATABASE ABSTRACTION AND DATA LINKAGE

CROSS REFERENCE TO RELATED APPLICATIONS

This application is a continuation of U.S. Utility patent application Ser. No. 16/018,600, filed on Jun. 26, 2018, which claims priority to U.S. Provisional Application 62/524,762, filed Jun. 26, 2017, the contents of which are incorporated by reference herein in their entirety.

FIELD OF THE INVENTION

The invention relates generally to a system and method for providing database abstraction and data linkage.

BACKGROUND OF THE INVENTION

Determining connections among different customer attributes to find potentially fraudulent activity requires significant manual work. Online activity data, demographic data, and account data all sit in different databases/tables and require a user to perform many database queries and subsequent data manipulation. As a result, fraudulent activity goes undetected.

These and other drawbacks exist.

SUMMARY OF THE INVENTION

According to one embodiment, the invention relates to a system that implements a database abstraction and data linkage engine. The system comprises: a central data repository that stores and maintains customer data; an interactive user interface that receives an input; and a computer processor, coupled to the memory component and the interactive interface, configured to perform the steps comprising: receiving, via the input, one or more attributes to form a basis for a network of connections having a predetermined number order representative of network size; executing one or more queries of the central data repository for events relating to the one or more attributes; dynamically creating attribute datasets based on the events, wherein the attribute datasets comprise IP addresses, residence addresses, email addresses, names, devices, phone numbers, accounts and internal identifiers; iterating the steps of executing and creating for the predetermined number order to generate the network of connections; and generating an output that represents the network of connections.

An embodiment of the present invention is directed to a method for implementing database abstraction and data linkage. The method comprises the steps of: receiving, via an input of an interactive user interface, one or more attributes to form a basis for a network of connections having a predetermined number order representative of network size; executing, via a computer processor, one or more queries of a central data repository for events relating to the one or more attributes; dynamically creating, via the computer processor, attribute datasets based on the events, wherein the attribute datasets comprise IP addresses, residence addresses, email addresses, names, devices, phone numbers, accounts and internal identifiers; iterating, via the computer processor, the steps of executing and creating for the predetermined number order to generate the network of connections; and generating an output that represents the network of connections.

The system may include a specially programmed computer system comprising one or more computer processors, interactive interfaces, electronic storage devices, and networks.

The computer implemented system, method and medium described herein provide unique advantages to entities, organizations and other users, according to various embodiments of the invention. The innovative system and method provides an engine/tool to identify a network based on one or more attributes. The network may dynamically expand to multiple degrees to identify potential fraudulent connections. The innovations of the database abstraction and data linkage engine provides analysis to identify fraud that would otherwise go undetected. The innovative engine provides a significant improvement to manual link analysis processes and fraud investigation research. These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF THE PREFERRED EMBODIMENT(S)

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

According to an embodiment of the present invention, a system implements a data abstraction engine that receives or identifies an attribute (e.g., names, IP address, device identifiers, addresses, phone numbers, account numbers, etc.) and generates a network with connections and associations based on the attribute. Using the attribute, the system may identify related online activity, demographic data, account data and/or other activity, events and data associated with the attribute. The system may then iterate over attributes of the network and return a network of connections having multiple degrees of association. The system may further identify or highlight potential or likely fraudulent connections for further analysis and detail.

According to an embodiment of the present invention, the user may provide inputs and the system may automatically generate an appropriately sized network based on the input. For example, the input may include one or more attributes as well as goals and/or purposes, such as fraud detection, confirmation of suspicious activity, research, analytics, etc. Based on the inputs, the resulting network may be generated in an optimized manner.

For example, the innovative data abstraction engine may be linked to known bad actor data and then perform automated queries on this data to proactively alert potentially fraudulent activity. The data abstraction engine may also add other attributes and apply machine learning to the associations to more intelligently describe the returned network. Further, the engine may be developed to describe larger networks having multiple degrees of connections.

Figure 1:
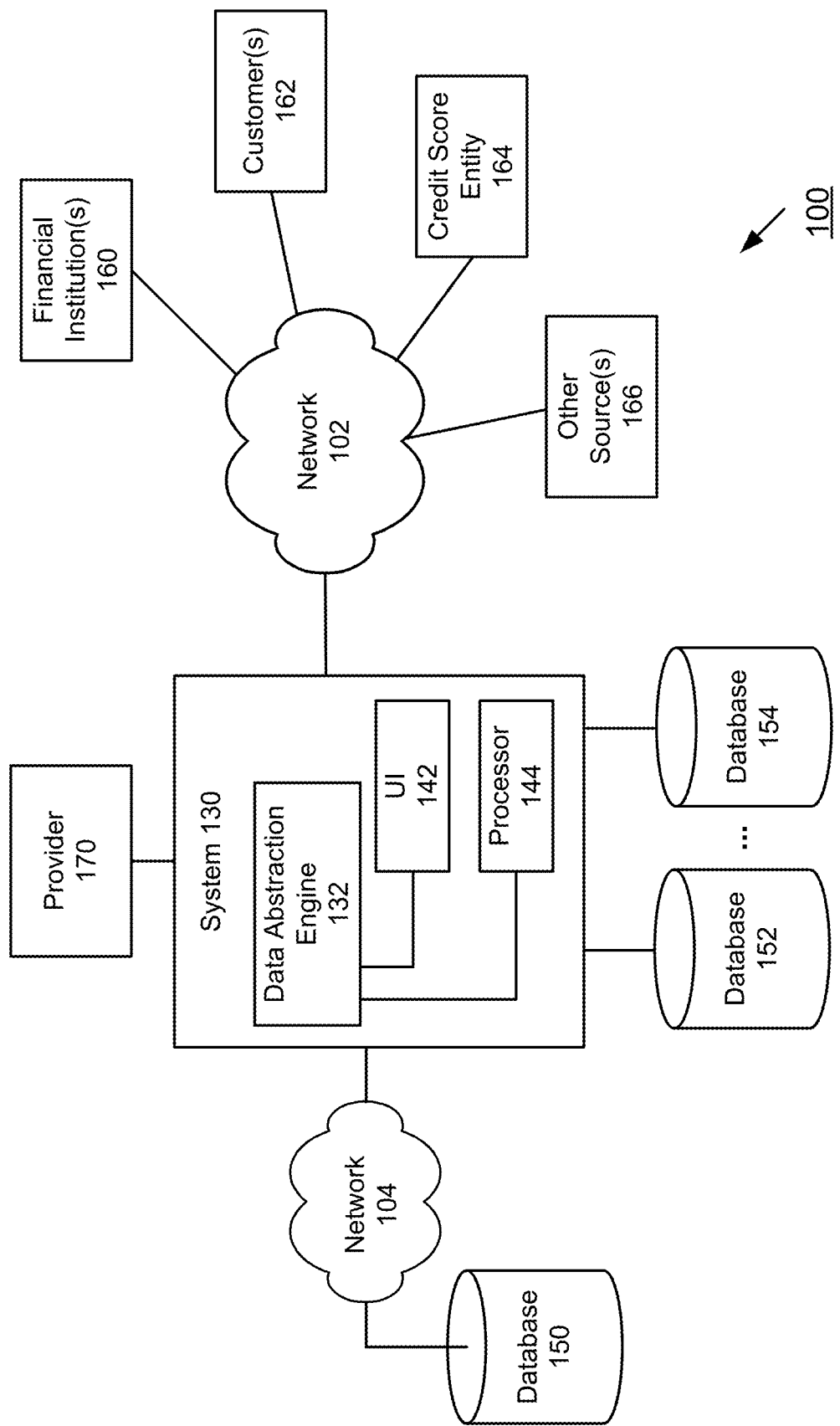
FIG. 1 is a schematic diagram of a system that implements database abstraction and data linkage, according to an embodiment of the present invention.

FIG. 1 is a schematic diagram of a system that implements database abstraction and data linkage, according to an embodiment of the present invention. As shown in FIG. 1, system 130 may execute a Data Abstraction Engine 132 that automates and facilitates network creation based an attribute in accordance with the various embodiments of the present invention. Data Abstraction Engine 132 may also incorporate modules and other functions, such as User Interface 142 and Processor 144. These modules are exemplary and illustrative, Data Abstraction Engine 132 may interact with additional modules, a combination of the modules described and/or less modules than illustrated. While a single illustrative block, module or component is shown, these illustrative blocks, modules or components may be multiplied for various applications or different application environments. The modules and/or components may be further duplicated, combined and/or separated across multiple systems at local and/or remote locations. Other architectures may be realized.

Data Abstraction Engine 132 may be implemented in various systems and platforms to provide data abstraction and data linkage to generate a network having a predetermined number of degrees based on one or more attributes that may or may not relate to a known fraud. For example, the input may include a known bad account wherein the network is generated to identify other related accounts. According to another example, the input may be a suspicious phone number retrieved during an IVR session. In yet another example, the input may be a new customer address to confirm the new customer is clear of connections to fraudulent activity.

System 130 may represent any company, service or product provider, financial institution, or other user or entity. System 130 may communicate with local storage components represented by Databases 152, 154 as well as remote sources, such as Database 150 via Network 104. Additional information may be retrieved from financial institution(s) 160, activity from customer devices, represented by 162. Credit score data may be received from Credit Score Entity 164. Other sources 166 may include service providers, merchants, mobile device carriers, etc. The database abstraction features described herein may be provided by System 130 and/or a third party provider, represented by 170, where Provider 170 may operate with System 130.

The system 100 of FIG. 1 may be implemented in a variety of ways. Architecture within system 100 may be implemented as hardware components (e.g., module) within one or more network elements. It should also be appreciated that architecture within system 100 may be implemented in computer executable software (e.g., on a tangible, non-transitory computer-readable medium) located within one or more network elements. Module functionality of architecture within system 100 may be located on a single device or distributed across a plurality of devices including one or more centralized servers and one or more mobile units or end user devices. The architecture depicted in system 100 is meant to be exemplary and non-limiting. For example, while connections and relationships between the elements of system 100 is depicted, it should be appreciated that other connections and relationships are possible. The system 100 described below may be used to implement the various methods herein, by way of example. Various elements of the system 100 may be referenced in explaining the exemplary methods described herein.

Networks 102, 104 may be a wireless network, a wired network or any combination of wireless network and wired network. Also, Networks 102, 104 may support an Internet network, a wireless communication network, a cellular network, Bluetooth, or the like, or any combination thereof. Although Networks 102, 104 is depicted as one network for simplicity, it should be appreciated that according to one or more embodiments, Networks 102, 104 may comprise a plurality of interconnected networks, such as, for example, a service provider network, the Internet, a cellular network, corporate networks, or even home networks, or any of the types of networks. Data may be transmitted and received via Networks 102, 104 utilizing a standard networking protocol or a standard telecommunications protocol.

While FIG. 1 illustrates individual devices or components, it should be appreciated that there may be several of such devices to carry out the various exemplary embodiments. Data Abstraction Engine 132 may be accessed using any mobile or computing device, such as a laptop computer, a personal digital assistant, a smartphone, a smartwatch, smart glasses, other wearables or other computing devices capable of sending or receiving network signals. Customer devices may have an application installed that is associated with System 130.

System 130 may be communicatively coupled to storage components, such as Databases 150, 152, 154. These storage components may include any suitable data structure to maintain the information and allow access and retrieval of the information. For example, the storage components may keep the data in an organized fashion. The storage may be local, remote, or a combination. Communications with the storage components may be over a network, such as Network 102 or 104, or communications may involve a direct connection between the various storage components and System 130, as depicted in FIG. 1. The storage components may also represent cloud or other network based storage.

Figure 2:
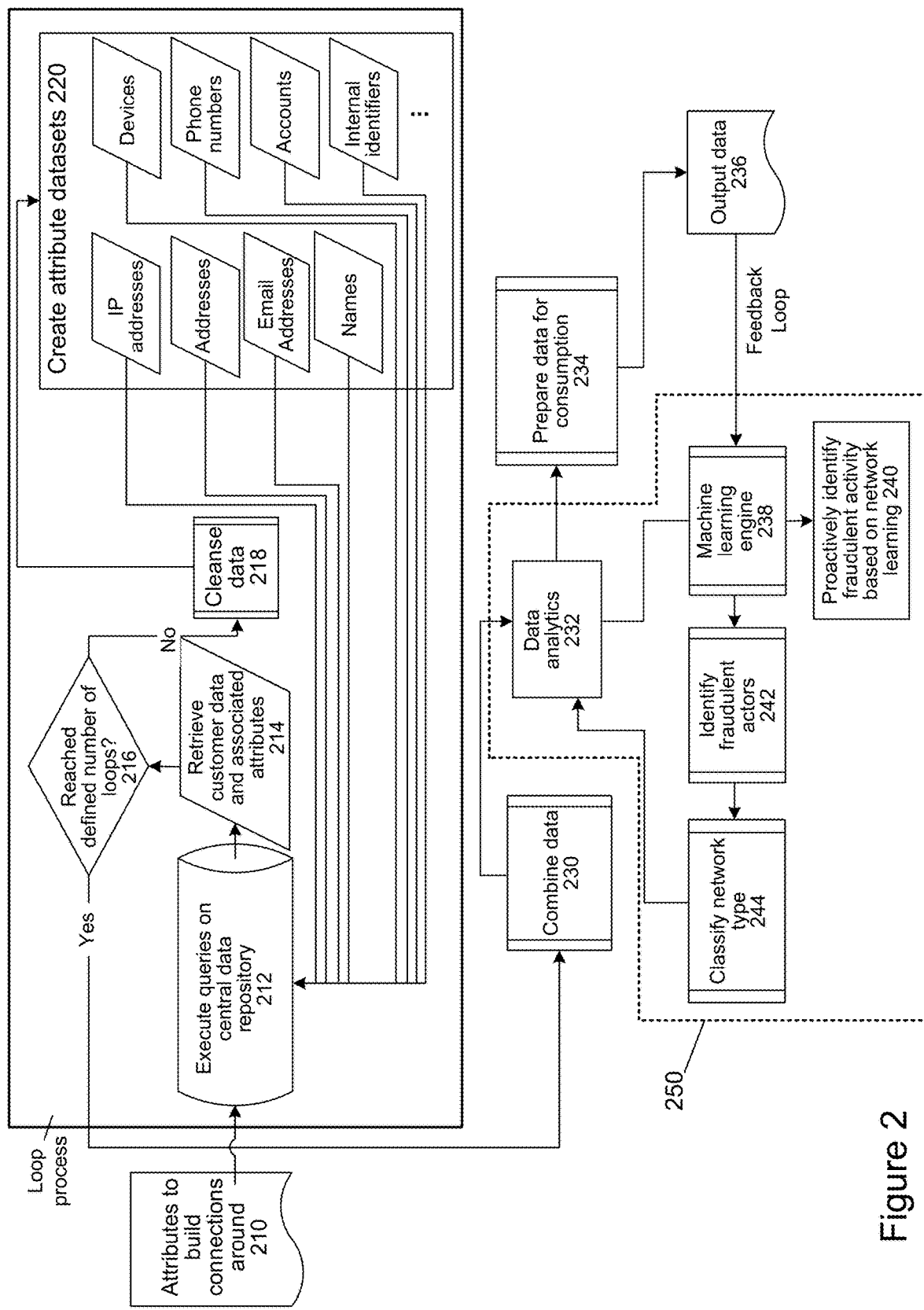
FIG. 2 is an exemplary detailed flow diagram that illustrates database abstraction and data linkage, according to an embodiment of the present invention.

FIG. 2 is an exemplary detailed flow diagram that illustrates database abstraction and data linkage, according to an embodiment of the present invention. Step 210 represents an input of one or more attributes to build connections around. At step 212, a query may be executed on a repository to extract activity relating to or involving the one or more reference attributes. At step 214, the system may retrieve customer data and associated attributes. At step 216, a determination may be made as to whether the system reached a defined number of database search loops or interactions. At step 218, the system may cleanse the data. At step 220, the system may create attribute datasets. If a defined number of database search loops have been reached, the system may then combine data from database queries, at step 230. Data analytics may be performed at step 232. At step 234, data may then be prepared for consumption by other software, analysts, receiving systems, applications, etc. At step 236, the system may generate an output via an interactive user interface. An embodiment of the present invention may be directed to implementing a machine learning engine, as represented by 250. The order illustrated in FIG. 2 is merely exemplary. While the process of FIG. 2 illustrates certain steps performed in a particular order, it should be understood that the embodiments of the present invention may be practiced by adding one or more steps to the processes, omitting steps within the processes and/or altering the order in which one or more steps are performed. Additional details of the steps are described below.

Step 210 represents an input of one or more attributes to build connections around. For example, the attributes may include IP addresses, email addresses, physical addresses, names, devices, phone numbers, accounts, internal identifier, etc. The attributes may be identified by a separate application (e.g., fraud application, fraud system, etc.) and provided electronically as an input. The attributes may be associated with a known bad activity. For example, the input may represent an account number having fraudulent charges, a name associated with a known fraudster, a phone number from where a fraudulent purchase or activity was made, etc. The input may also represent potentially suspicious activity or other event that meets a predetermined risk threshold. For example, a system may identify a potentially suspicious activity where one or more related attributes may be used to determine a network of connections. The potentially suspicious activity may be confirmed based on the network connections to other known or potentially fraudulent events, players, activities, etc. According to another example, a network may be created for research and analysis. For example, a new customer identifier may be researched to confirm good standing. As shown in FIG. 2, the system may receive one or more attributes as well as a group or category of attributes. The initial input may be any event, data, identifier, dataset, etc.

At step 212, queries may be executed on a repository to extract activity relating to or involving the one or more reference attributes. Such activity may include online activity, demographic information, and account information associated with attribute. The repository may represent a central data repository as well as a plurality of repositories in a single location or across multiple locations. For example, the central data repository may represent internal sources (e.g., lines of business, etc.), external intelligent sources, and a combination thereof. External sources may also include credit score companies, merchants, service providers, government entities, third party investigations, media sources, etc.

At step 214, the system may retrieve customer data and associated attributes. For example, the input attribute may be associated with a customer identifier. The customer identifier may then be used to generate additional attributes. For example, a customer identifier may be associated with household members. The customer identifier may also identify former and past identifiers, accounts and even closed or dormant accounts.

An embodiment of the present invention is directed to analyzing fraudulent activity that occurs at a firm, entity and/or other partner entity (e.g., financial institution, partner bank, etc.). The system may use the analysis to identify fraudulent connections to that activity. For example, a fraudster may open a bad bank account to perform fraudulent transactions. This may be referred to as a money mule. Money mules generally refer to a person who receives and transfers illegally acquired money on behalf of others. This may occur electronically, where the money may be transferred from a mule's account to a scam operator, typically in another country. For example, a money mule may have a connection to another money mule. The connection may include a common online account, activity from the same computer device or same IP address, or the same email address to set up the accounts. For example, the system may recognize that a known bad actor has repeatedly shared a WiFi network in a plurality of different locations with the same person over a certain period of time. Other commonalities may exist. An embodiment of the present invention is directed to identifying how fraudulent actions may be linked to various attributes, events, etc. Also, the common attributes may be multiple degrees away from each other so that a network of connections may be needed to identify related activity. Accordingly, an embodiment of the present invention is directed to building a network of fraudulent activity and then analyzing and identifying the connections therein.

At step 216, a determination may be made as to whether the system reached a defined number of database search loops or iterations. The number of iterations is related to the size of a network of connections. The tool may iterate to generate a network that has multiple degrees, e.g., $2^{nd}$ degree network, $3^{rd}$ degree network, Nth degree network. The number of iterations may be predetermined and/or dynamically generated by the system. The number of iterations may be an optimized number based on the input, business need, quality of data and datasets, etc. An embodiment of the present invention recognizes that there is rarely a direct connection between fraudulent events. Oftentimes, fraud connections are layered and relevant events within the connection are a couple degrees away from each other. For example, a first fraudster may open an account in one geographic area while a second fraudster opens a completely different type of account in a different area but both accounts exhibit online activity from the same device (or device in a household or other association).

At step 218, the system may cleanse the data. The data may be filtered for duplicates and formatted based on a particular use, application or receiving program.

At step 220, the system may create attribute datasets. Upon completion of the iteration process, the tool may then create attribute datasets to run back through the process to create a network having N number of degrees. Representative datasets may include IP addresses, addresses (e.g., home, office, vacation home, etc.), email addresses, names (e.g., family members, partners, close contacts, etc.), devices (e.g., computers, laptops, mobile phones, mobile devices, wearables, automobiles, Internet of Things (IoT) devices, voice devices, etc.), phone numbers, accounts, internal identifiers, etc. Other categories and datasets may be applied as additional data is identified and new connections are created.

If a defined number of database search loops have been reached, the system may then combine data from database searches, at step 230. Other relevant information from various sources, including external and third party sources, may be identified and combined at step 230.

Data analytics may be performed at step 232. At step 234, data may then be prepared for consumption by other software, analysts, receiving system, application, etc. Based on the receiving system, the data may be filtered, formatted, organized and otherwise modified accordingly.

At step 236, the system may generate an output. The output may be an interactive display. The output may include various forms of reports, as well as actions including exporting, transmitting to other systems, such as transaction systems, risk systems, investigatory systems, data science systems, etc.

An embodiment of the present invention may be directed to integrating a machine learning engine, as represented by 250. Machine Learning ("ML") engine may receive feedback data from output data 236, as shown by 238. The ML engine may proactively identify fraudulent activity based on network learning at 240. The ML engine may also identify potentially fraudulent actors at 242. Network type (e.g., credential testing, money mule, etc.) may be classified at 244.

An embodiment of the present invention may apply machine learning to identify and discover patterns in the connections and further classify programmatically what the network represents. For example, machine learning may distinguish between a money mule network and botnet credential testing activity. Machine learning may be applied to identify and develop knowledge of various fraud patterns. The system may identify fraudulent acts, as well as potentially fraudulent acts based on those patterns within the networks that can potentially classify the networks and proactively identify fraudulent activity.

For example, machine learning may be applied to identify patterns in the networks, based on learned fraudulent activity. Networks of certain types of fraud (e.g., money mules, credential testing, etc.) may feed datasets to the engine and train through back propagation and confirming/denying classifications thereby training the system to identify those connections.

Figure 3:
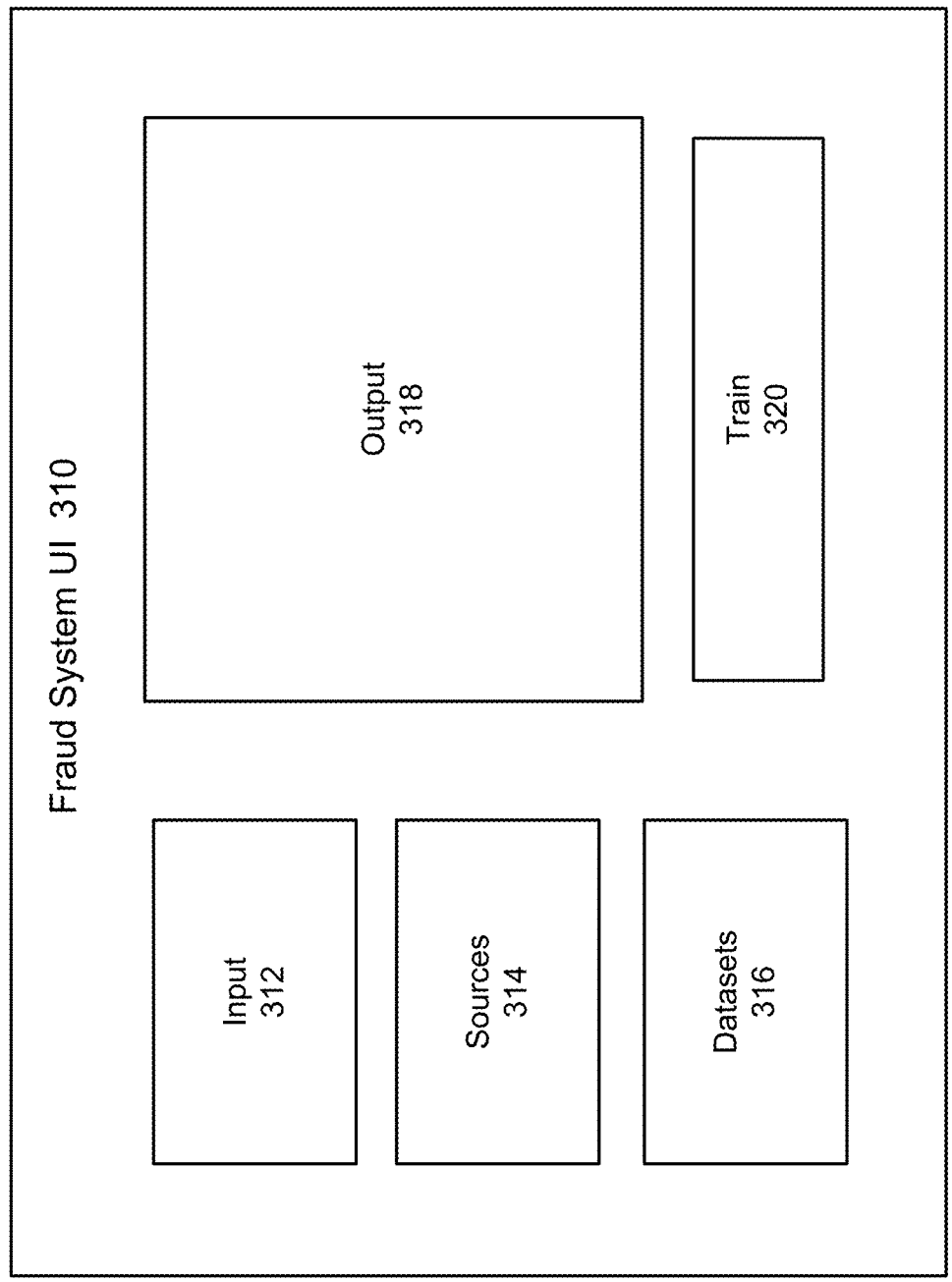
FIG. 3 illustrates an exemplary interactive interface, according to an embodiment of the present invention.

FIG. 3 illustrates an exemplary interactive interface, according to an embodiment of the present invention. In the example of FIG. 3, the data abstraction engine may be integrated with a fraud system. Integrations with other systems (e.g., marketing system, etc.) may be realized. An interactive interface, as represented by Fraud System User Interface 310, of an embodiment of the present invention may display Input 312, Sources 314, Datasets 316, Output 318 and Train 320.

According to an embodiment of the present invention, an input, as shown by 312, may include an attribute to build a connection around. For example, the input may include an IP address that is known (or suspected) to be associated with a fraudulent activity or a potential bad act. The tool may receive the IP address and then automatically identify various connections based on the IP address. For example, the tool may link to the IP address and gather different associated customers and their attributes that are associated with the IP address. The system may also identify sources of data, e.g., internal sources, external sources, third party sources, etc. The system may also provide details concerning datasets, at 316. Output 318 may illustrate a resulting network having a predetermined number order. The system may provide a training feature, through Train 320. This provides additional learning of networks and known bad events to further refine the accuracy of the system. Train 320 may also provide the ability to generate models for fraud prediction.

Figure 4:
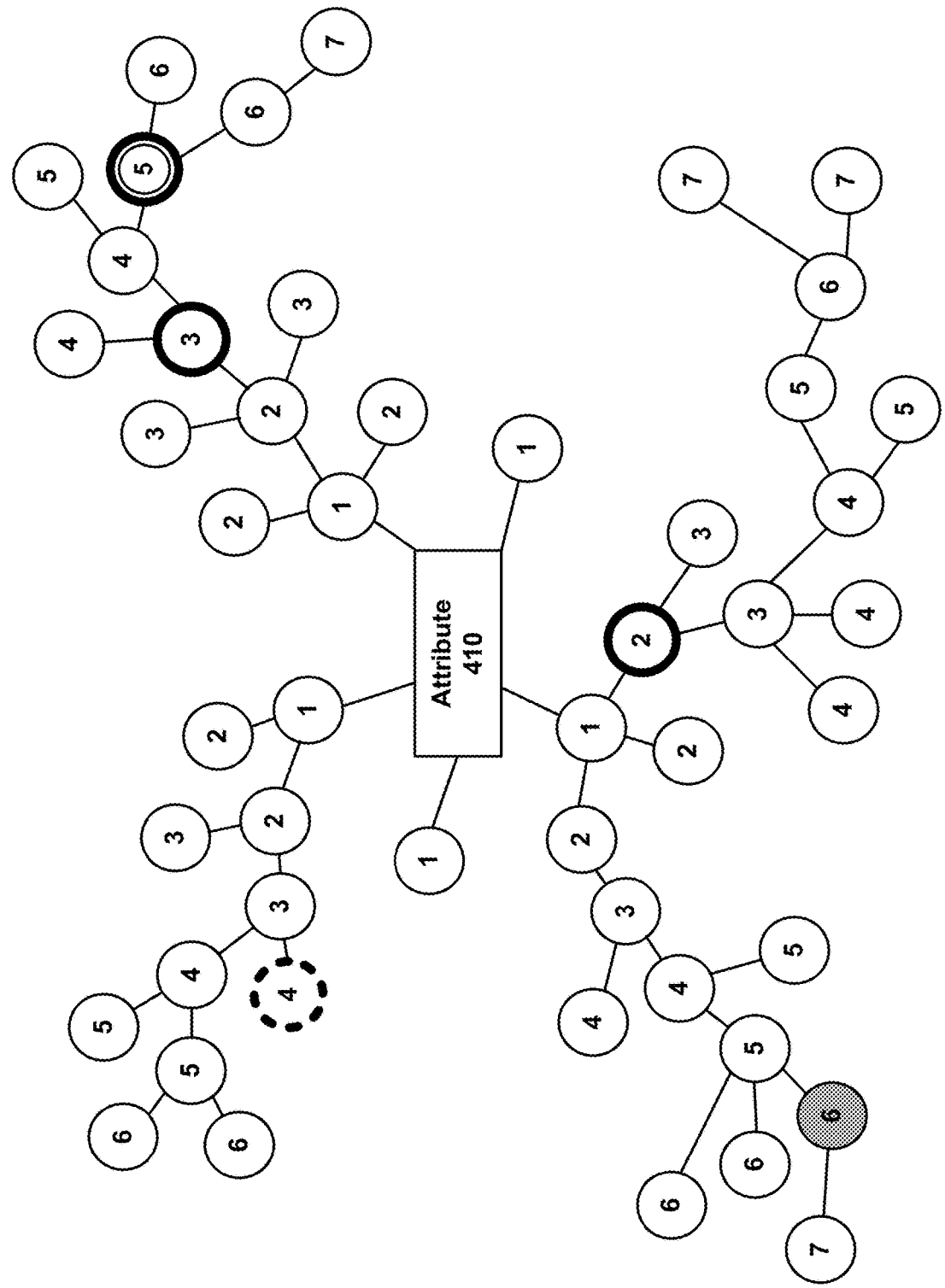
FIG. 4 illustrates an exemplary illustration of a network, according to an embodiment of the present invention.

FIG. 4 illustrates an exemplary illustration of a network, according to an embodiment of the present invention. The graphic shown in FIG. 4 is just one exemplary illustration that is simplified. Other formats and depictions of networks may be provided. In FIG. 4, Attribute 410 may represent an input attribute. For each iteration, an order of network may be generated. As shown, a first order network is shown by the nodes labeled "1." Each node may represent an attribute, dataset and/or other data. With each iteration, additional associations may be identified. The example of FIG. 4 shows a $7^{th}$ order network. The iterations may be performed on a select node, subset of nodes and/or all the nodes. The nodes may also be displayed by priority. For example, nodes that are of concern (e.g., suspicious or potentially fraudulent) may be highlighted and further details may be provided. As shown in FIG. 4, certain nodes that represent datasets and/or attributes may be highlighted. For example, nodes in bold may indicate potential fraud activity. Nodes that are greyed in may indicate current fraud activity. And, nodes that are dashed may indicate that additional analysis should be performed. Other indicators and graphics may be provided based on the integrated system. Other variations may be realized.

The foregoing examples show the various embodiments of the invention in one physical configuration; however, it is to be appreciated that the various components may be located at distant portions of a distributed network, such as a local area network, a wide area network, a telecommunications network, an intranet and/or the internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers may include software or computer programs stored in memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, R, JavaScript and/or Python. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system for implementing database abstraction and data linkage, the system comprising:
    a central data repository that stores and maintains customer data;
    an interactive user interface that receives an input; and
    a computer processor, coupled to the central data repository and the interactive interface, configured to:
    receive, via the input, a reference attribute connected to potentially fraudulent activity, wherein the reference attribute comprises a first set of one or more attributes to build connections around;
    execute a plurality of queries to extract activity relating to the reference attribute from the central data repository;
    determine a plurality of associated attributes that are associated with the reference attribute through the extracted activity;
    responsive to the extracted activity, dynamically create one or more attribute datasets based on grouping one or more of the associated attributes that are determined to be of a specific data type;
    iterate, for a system determined number of iterations, the execute, the determine, and the create; and
    generate an output that represents a network of connections, the size of the network of connections is based on the system determined number of iterations, the network of connections comprises interactive icons that enable a user to view underlying details of a selected attribute.

2. The system of claim 1, wherein data analytics are applied to the one or more attribute datasets to identify one or more potentially fraudulent actors.

3. The system of claim 1, wherein data analytics are applied to the one or more attribute datasets to classify one or more network types.

4. The system of claim 1, wherein the reference attribute connected to potentially fraudulent activity represents an attribute associated with a known fraudulent actor.

5. The system of claim 1, wherein the customer data is from one or more third party data sources.

6. The system of claim 1, wherein the central data repository further comprises one or more other external sources of data.

7. The system of claim 1, wherein the computer processor is further configured to:
    apply data analytics using a machine learning engine.

8. The system of claim 1, wherein the output is applied to machine learning engine, as a feedback loop, to identify one or more fraudulent events.

9. The system of claim 1, wherein the computer processor is integrated with a fraud system.

10. A method for implementing database abstraction and data linkage, the method comprising:
    receiving, via an input of an interactive user interface, a reference attribute connected to potentially fraudulent activity, wherein the reference attribute comprises a first set of one or more attributes to build connections around;
    executing, via a computer processor, a plurality of queries to extract activity relating to the reference attribute from the central data repository;
    determining, via the computer processor, a plurality of associated attributes that are associated with the reference attribute through the extracted activity;
    responsive to the extracted activity, dynamically creating, via the computer processor, one or more attribute datasets based on grouping one or more of the associated attributes that are determined to be of a specific data type;
    iterating, via the computer processor for a system determined number of iterations, the executing, the determining, and the creating; and generating an output that represents a network of connections, the size of the network of connections is based on the system determined number of iterations, and the network of connections comprises interactive icons that enable a user to view underlying details of a selected attribute.

11. The method of claim 10, wherein data analytics are applied to the one or more attribute datasets to identify one or more potentially fraudulent actors.

12. The method of claim 10, wherein data analytics are applied to the one or more attribute datasets to classify one or more network types.

13. The method of claim 10, wherein the reference attribute connected to potentially fraudulent activity represents an attribute associated with a known fraudulent actor.

14. The method of claim 10, wherein the customer data is from third party data sources.

15. The method of claim 10, wherein the central data repository further comprise one or more other external sources of data.

16. The method of claim 10, further comprising:
applying data analytics using a machine learning engine.

17. The method of claim 10, wherein the output is applied to machine learning engine, as a feedback loop, to identify one or more fraudulent events.

18. The method of claim 10, wherein the computer processor is integrated with a fraud system.

19. The system of claim 1, wherein the network of connections further comprises degrees of association and potential fraudulent connections.

20. The method of claim 10, wherein the network of connections further comprises degrees of association and potential fraudulent connections.

* * * * *